United States Patent
Omote

(10) Patent No.: US 7,129,756 B2
(45) Date of Patent: Oct. 31, 2006

(54) SEMICONDUCTOR INTEGRATED CIRCUIT

(75) Inventor: Kazuyuki Omote, Tokyo (JP)

(73) Assignee: Thine Electronics, Inc., Tokyo (JP)

( * ) Notice: Subject to any disclaimer, the term of this patent is extended or adjusted under 35 U.S.C. 154(b) by 174 days.

(21) Appl. No.: 10/497,457

(22) PCT Filed: Dec. 7, 2001

(86) PCT No.: PCT/JP01/10725

§ 371 (c)(1),
(2), (4) Date: Jun. 2, 2004

(87) PCT Pub. No.: WO03/049291

PCT Pub. Date: Jun. 12, 2003

(65) Prior Publication Data

US 2005/0007150 A1    Jan. 13, 2005

(51) Int. Cl.
H03K 19/20 (2006.01)
H03K 19/094 (2006.01)
H03K 19/0175 (2006.01)
H03K 19/086 (2006.01)
H03K 3/00 (2006.01)

(52) U.S. Cl. .............. 326/115; 326/121; 326/127; 326/83; 326/86; 327/112; 327/108

(58) Field of Classification Search .............. None
See application file for complete search history.

(56) References Cited

U.S. PATENT DOCUMENTS 5,990,711 A * 11/1999 Sekimoto .............. 327/112
6,111,431 A * 8/2000 Estrada .............. 326/83
6,118,438 A * 9/2000 Ho .............. 345/204
6,600,346 B1 * 7/2003 Macaluso .............. 327/108

FOREIGN PATENT DOCUMENTS

| JP | 10-270992 A | 10/1998 |
|----|-------------|---------|
| JP | 2000-41072 A | 2/2000 |
| JP | 2000-174605 A | 6/2000 |

* cited by examiner

Primary Examiner—Rexford Barnie
Assistant Examiner—Dylan White
(74) Attorney, Agent, or Firm—Sughrue Mion, PLLC

(57) ABSTRACT

A semiconductor integrated circuit with stabilized amplitude and offset potential of output signals comprising an output circuit including plural transistors supplied with differential signals, for performing switching operation. A first transistor is connected between a first power supply potential and the output circuit. A second transistor is connected between the output circuit and a second power supply potential. A third transistor is connected to the first power supply potential. A fourth transistor, passes a current proportional to that flowing in the second transistor. A differential amplifier controls gate potentials of the first and third transistors such that a potential at a connection point between a first resistance and a second resistance approaches a predetermined potential.

10 Claims, 4 Drawing Sheets

SEMICONDUCTOR INTEGRATED CIRCUIT

TECHNICAL FIELD

This application is a 371 of PCT/JP01/10725 filed on Dec. 7, 2001.

The present invention generally relates to a semiconductor integrated circuit, and specifically, to a semiconductor integrated circuit including a line driver for outputting small-amplitude differential signals to external.

BACKGROUND ART

Recently, a system using small-amplitude differential signals (low voltage differential signaling: LVDS) is adopted in signal transmission between a graphic board and a display unit of a personal computer and the like. According to this system, EMI (electromagnetic interference) can be suppressed compared to the case where a digital signal is transmitted in full swing.

In FIG. 1, an example of a conventional line driver used in the LVDS system is shown. This line driver includes N-channel MOS transistors QN11 to QN14 for performing switching operation as differential signals In1 and In2 are input to the gates thereof, a constant current source CS for supplying constant current from a power supply potential $V_{DD}$ on the higher voltage side to the transistors QN11 and QN13, an N-channel MOS transistor QN15 connected between a source (node 102) of the transistors QN12 and QN14 and a power supply potential $V_{SS}$ on the lower voltage side, and an operational amplifier OP11 for controlling a gate voltage of the transistor QN15.

To a non-inverting input of the operational amplifier OP11, a reference potential $V_{REF}$ is supplied, and, to an inverting input of the operational amplifier OP11, a potential of the node 102 is fed back. Thereby, the potential of the node 102 is controlled so as to approach the reference potential $V_{REF}$.

The potentials of the respective input signals In1 and In2 vary in a range from the power supply potential $V_{SS}$ on the lower voltage side to the power supply potential $V_{DD}$ on the higher voltage side. In accordance with this, the transistors QN11 to QN14 perform switching operation. For example, when the input signal In1 is at a low level and the input signal In2 is at a high level, the transistors QN11 and QN14 assume an off-state and the transistors QN12 and QN13 assume an on-state. Thereby, current $I_D$ flows in a terminating resistance $R_T$ on the reception side and an output voltage $\Delta V = I_D \times R_T$ is generated between a node 100 and a node 101.

Further, assuming that the potentials of the node 100 and the node 101 are $V_{100}$ and $V_{101}$, respectively, an offset potential $V_{OS}$ of the differential outputs is expressed by $V_{OS} = (V_{100} + V_{101})/2$. The reference potential $V_{REF}$ supplied to the non-inverting input of the operational amplifier OP11 is determined so that the offset potential $V_{OS}$ takes a target value.

However, in the line driver shown in FIG. 1, when the transistors QN11 to QN14 are switched frequently, the potential variation of the node 102 becomes greater and the offset potential $V_{OS}$ is apt to become unstable. In order to improve this, it is conceivable that the open gain of the operational amplifier OP11 is increased, however, on the other hand, a problem arises that the operational amplifier OP11 becomes apt to oscillate due to power supply noise etc. Further, it is necessary to vary both the constant current source CS and the reference potential $V_{REF}$ in order to change the output voltage $\Delta V$ with the offset potential $V_{OS}$ kept constant, and accordingly, the circuit for generating these becomes complicated.

In FIG. 2, another example of the conventional line driver used in the LVDS system is shown. This line driver includes N-channel MOS transistors QN21 to QN24 for performing switching operation as differential signals In1 and In2 are input to the gates thereof, an N-channel MOS transistor QN26 connected between a power supply potential $V_{DD}$ on the higher voltage side and a drain (node 203) of the transistors QN21 and QN23, an operational amplifier OP21 for controlling a gate voltage of the transistor QN26, an N-channel MOS transistor QN25 connected between a source (node 202) of the transistors QN22 and QN24 and a power supply potential $V_{SS}$ on the lower voltage side, and an operational amplifier OP22 for controlling a gate voltage of the transistor QN25.

To a non-inverting input of the operational amplifier OP21, a reference potential $V_{REF}1$ is supplied, and, to an inverting input of the operational amplifier OP21, a potential of the node 203 is fed back. Thereby, the potential of the node 203 is controlled so as to approach the reference potential $V_{REF}1$. Similarly, to a non-inverting input of the operational amplifier OP22, a reference potential $V_{REF}2$ is supplied, and, to an inverting input of the operational amplifier OP22, a potential of the node 202 is fed back. Thereby, the potential of the node 202 is controlled so as to approach the reference potential $V_{REF}2$.

The potentials of the respective input signals In1 and In2 vary in a range from the power supply potential $V_{SS}$ on the lower voltage side to the power supply potential $V_{DD}$ on the higher voltage side. In accordance with this, the transistors QN21 to QN24 perform switching operation. For example, when the input signal In1 is at the low level and the input signal In2 is at the high level, the transistors QN21 and QN24 assume the off-state and the transistors QN22 and QN23 assume the on-state. Thereby, the node 200 has a high output potential $V_{OH}$ and the node 201 has a low output potential $V_{OL}$, and an output voltage $\Delta V = V_{OH} - V_{OL}$ is generated between the node 200 and the node 201.

Here, the reference potential $V_{REF}1$ and the reference potential $V_{REF}2$ respectively supplied to the non-inverting inputs of the operational amplifiers OP21 and OP22 are determined so that the output potentials $V_{OH}$ and $V_{OL}$ take target values. An offset potential $V_{OS}$ of the differential outputs is expressed by $V_{OS} = (V_{OH} + V_{OL})/2$.

However, in the line driver shown in FIG. 2, when the transistors QN21 to QN24 are switched frequently, the potential variation of the nodes 203 and 202 also become greater and the output potentials $V_{OH}$ and $V_{OL}$ are apt to become unstable. Therefore, the line driver shown in FIG. 2 also has the same problem as that of the line driver shown in FIG. 1. Further, it is necessary to vary both the reference potential $V_{REF}1$ and the reference potential $V_{REF}2$ in order to change the output voltage $\Delta V$ with the offset potential $V_{OS}$ kept constant, and accordingly, the circuit for generating these becomes complicated.

On the other hand, in U.S. Pat. No. 6,111,431, a line driver of LVDS system as shown in FIG. 3 is disclosed. This line driver is constituted by a driver circuit 32 and a replica circuit 31 (referred to as "mimicking circuit") for controlling the operation of the driver circuit 32.

The driver circuit 32 includes N-channel MOS transistors QN31 to QN34 for performing switching operation as differential signals In1 and In2 are input to the gates thereof, a P-channel MOS transistor QP31 connected between a power supply potential $V_{DD}$ on the higher voltage side and a drain (node 303) of the transistors QN31 and QN33, an operational amplifier OP31 for controlling a gate voltage of the transistor QP31, an N-channel MOS transistor QN35 connected between a source (node 302) of the transistors QN32 and QN34 and a power supply potential $V_{SS}$ on the lower voltage side, and an operational amplifier OP32 for controlling a gate voltage of the transistor QN35.

In order to supply predetermined potentials to a non-inverting input (node 304) of the operational amplifier OP31 and a non-inverting input (node 305) of the operational amplifier OP32, the replica circuit 31 is connected thereto. The replica circuit 31 includes a P-channel MOS transistor QP32 and N-channel MOS transistors QN36 to QN38 having 1/n sizes of the transistors QP31 and QN31 to QN35 used in the driver circuit 32, respectively, and two resistances each having resistance values of n/2 times that of the terminating resistance $R_T$ on the reception side.

The transistor QP32 is connected between the power supply potential $V_{DD}$ on the higher voltage side and a drain (node 304) of the transistor QN36. In the transistor QP32, there flows a drain current of 1/n of the drain current $I_D$ flowing in the transistor QP31 of the driver circuit 32. The transistors QN36 and QN37 constantly assume the on-state. The transistor QN38 is connected between a source (node 305) of the transistor QN37 and the power supply potential $V_{SS}$ on the lower voltage side.

Furthermore, the replica circuit 31 includes a current mirror circuit CMC for determining the drain current of the transistor QP32 and an operational amplifier OP33 for controlling a gate voltage of the transistor QN38.

To a non-inverting input of the operational amplifier OP33, a reference potential $V_{REF}$ is supplied, and, to an inverting input of the operational amplifier OP33, a potential of the node 306 is fed back. Thereby, the potential of the node 306 is controlled so as to approach the reference potential $V_{REF}$.

The potentials of the respective input signals In1 and In2 vary in a range from the power supply potential $V_{SS}$ on the lower voltage side to the power supply potential $V_{DD}$ on the higher voltage side. In accordance with this, the transistors QN31 to QN34 perform switching operation. For example, when the input signal In1 is at the low level and the input signal In2 is at the high level, the transistors QN31 and QN34 assume the off-state and the transistors QN32 and QN33 assume the on-state. Thereby, current $I_D$ flows in the terminating resistance $R_T$ on the reception side and an output voltage $\Delta V = I_D \times R_T$ is generated between the node 300 and the node 301. The current flowing in the transistor QP32 of the replica circuit 31 is determined so that the output voltage $\Delta V$ may take a target value.

Further, assuming that the potentials of the node 300 and the node 301 are $V_{300}$ and $V_{301}$, respectively, an offset potential of the differential output is expressed by $V_{OS} = (V_{300} + V_{301})/2$. The offset potential $V_{OS}$ varies in conjunction with the potential of the connection point (node 306) between the two resistances in the replica circuit 31. Therefore, the reference potential $V_{REF}$ supplied to the non-inverting input of the operational amplifier OP33 is determined so that the offset potential $V_{OS}$, i.e. the potential of the node 306 takes a target value.

The line driver shown in FIG. 3 is a circuit suitable for changing the output voltage $\Delta V$ with the offset potential $V_{OS}$ kept constant. However, the use of the three operational amplifiers makes the circuit complicated. Further, there is a problem that the operational amplifiers OP31 and OP32 for controlling the transistors QP31 and QN35 in which great current flows are apt to oscillate with the power noise etc. as a trigger.

DISCLOSURE OF THE INVENTION

Therefore, in view of the above-described problems, an object of the present invention is to provide a semiconductor integrated circuit capable of stabilizing the amplitude and the offset potential of the output signals without increasing the number of differential amplifiers such as operational amplifiers in a line driver for outputting small-amplitude differential signals to external.

In order to solve the above problems, a semiconductor integrated circuit according to the present invention comprises an output circuit including plural transistors supplied with differential signals, for performing switching operation; a first transistor connected between a first power supply potential and the output circuit; a second transistor connected between the output circuit and a second power supply potential; a third transistor connected to the first power supply potential; a fourth transistor for flowing therein a current proportional to a current flowing in the second transistor; a first resistance and a second resistance disposed in a path of a current flowing between the third transistor and the fourth transistor; and a differential amplifier for controlling gate potentials of the first and third transistors such that a potential at a connection point between the first resistance and the second resistance approaches a predetermined potential.

According to the present invention, since the current of the output circuit is controlled by the second transistor and the fourth transistor and the voltage of the output circuit is controlled based on the potential at the connection point between the first resistance and the second resistance provided as replicas of terminating resistances, the amplitude and the offset potential of the output signal can be stabilized without increasing the number of differential amplifiers such as operational amplifiers.

BRIEF DESCRIPTION OF THE DRAWINGS

Advantages and features of the present invention will be clear by considering the detailed description associated with the drawings. In these drawings, the same reference numeral indicates the same component element.

BEST MODE FOR CARRYING OUT THE INVENTION

Figure 1:
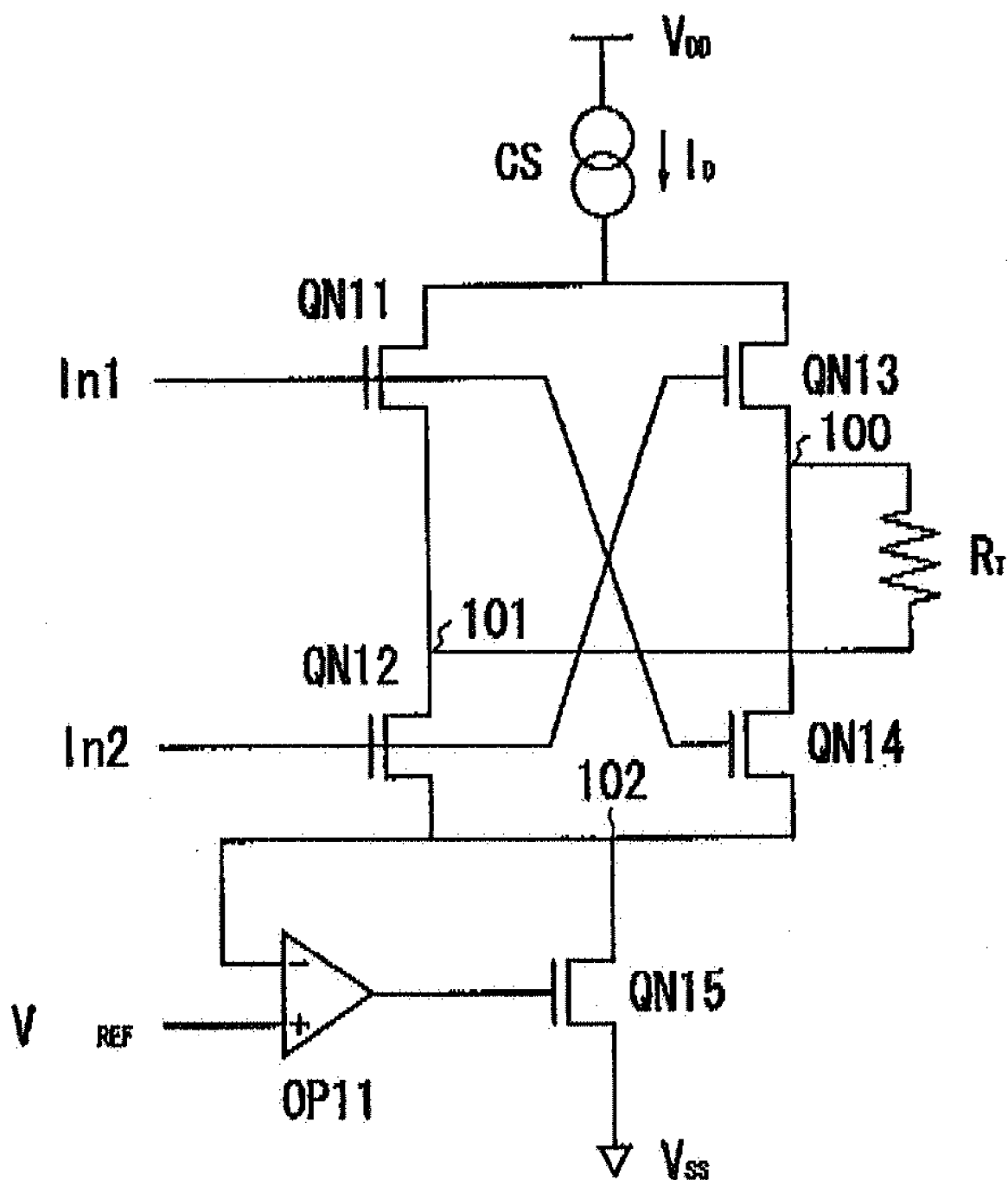
FIG. 1 is a circuit diagram showing an example of a conventional line driver used in the LVDS system.
Figure 2:
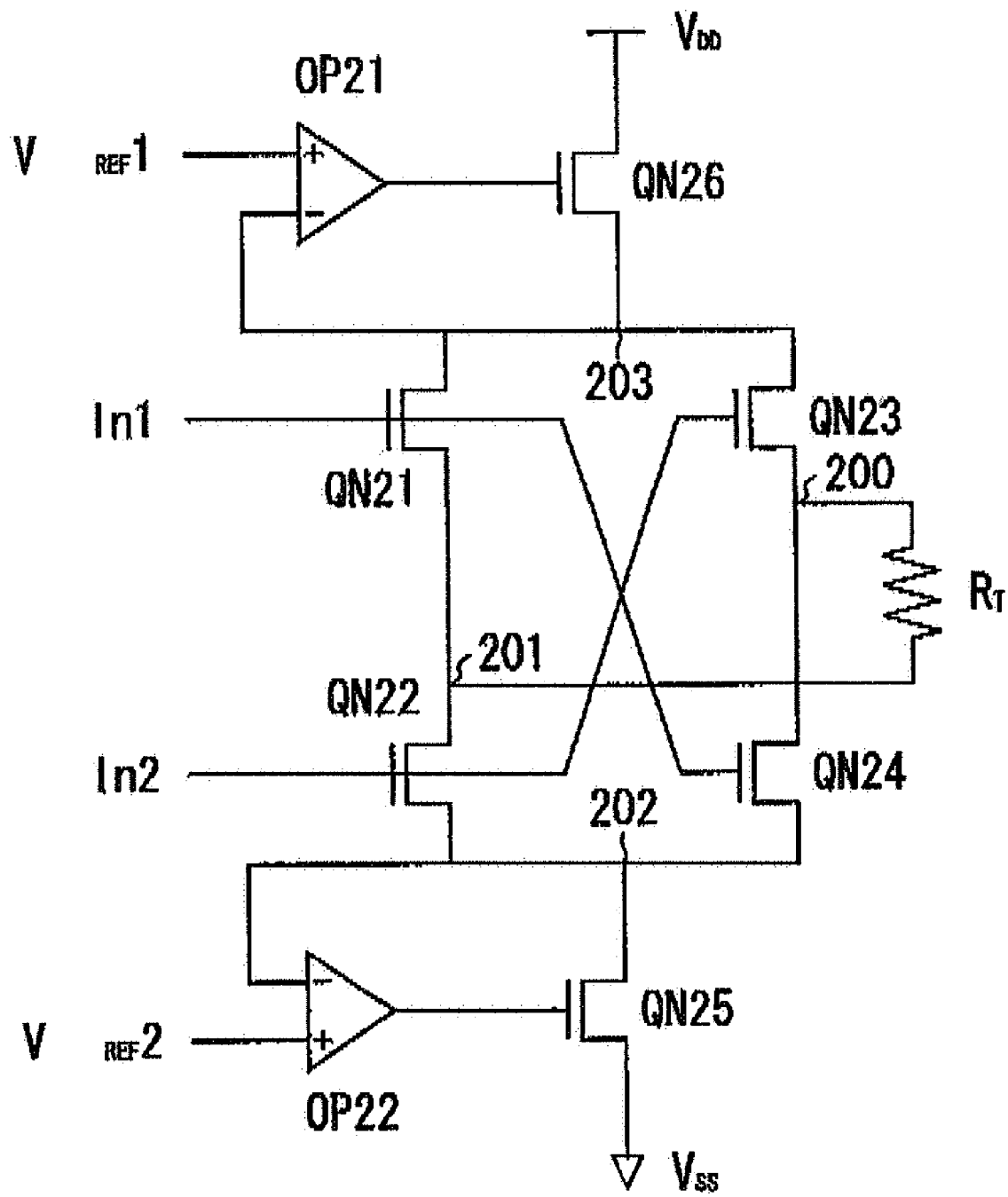
FIG. 2 is a circuit diagram showing another example of the conventional line driver used in the LVDS system.
Figure 3:
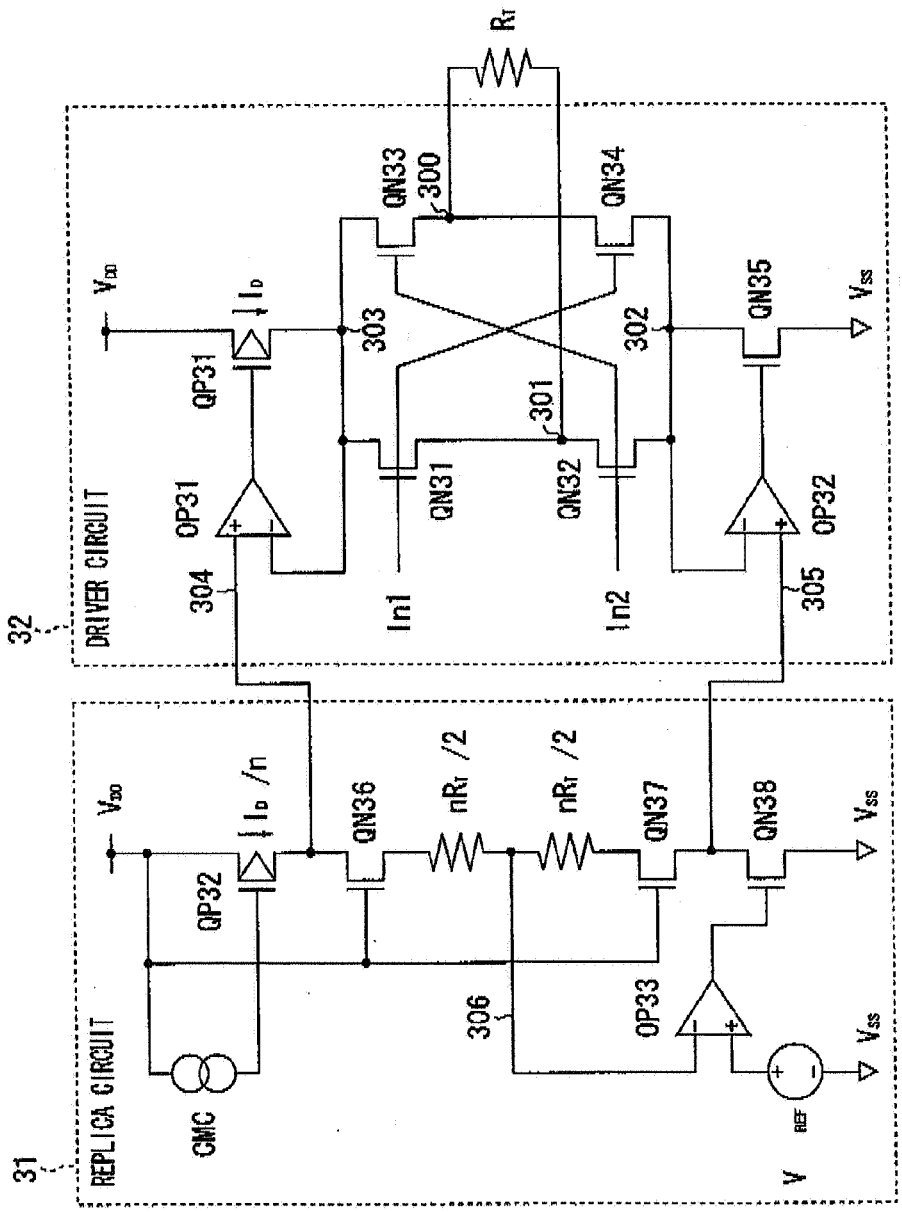
FIG. 3 is a circuit diagram showing yet another example of the conventional line driver used in the LVDS system.
Figure 4:
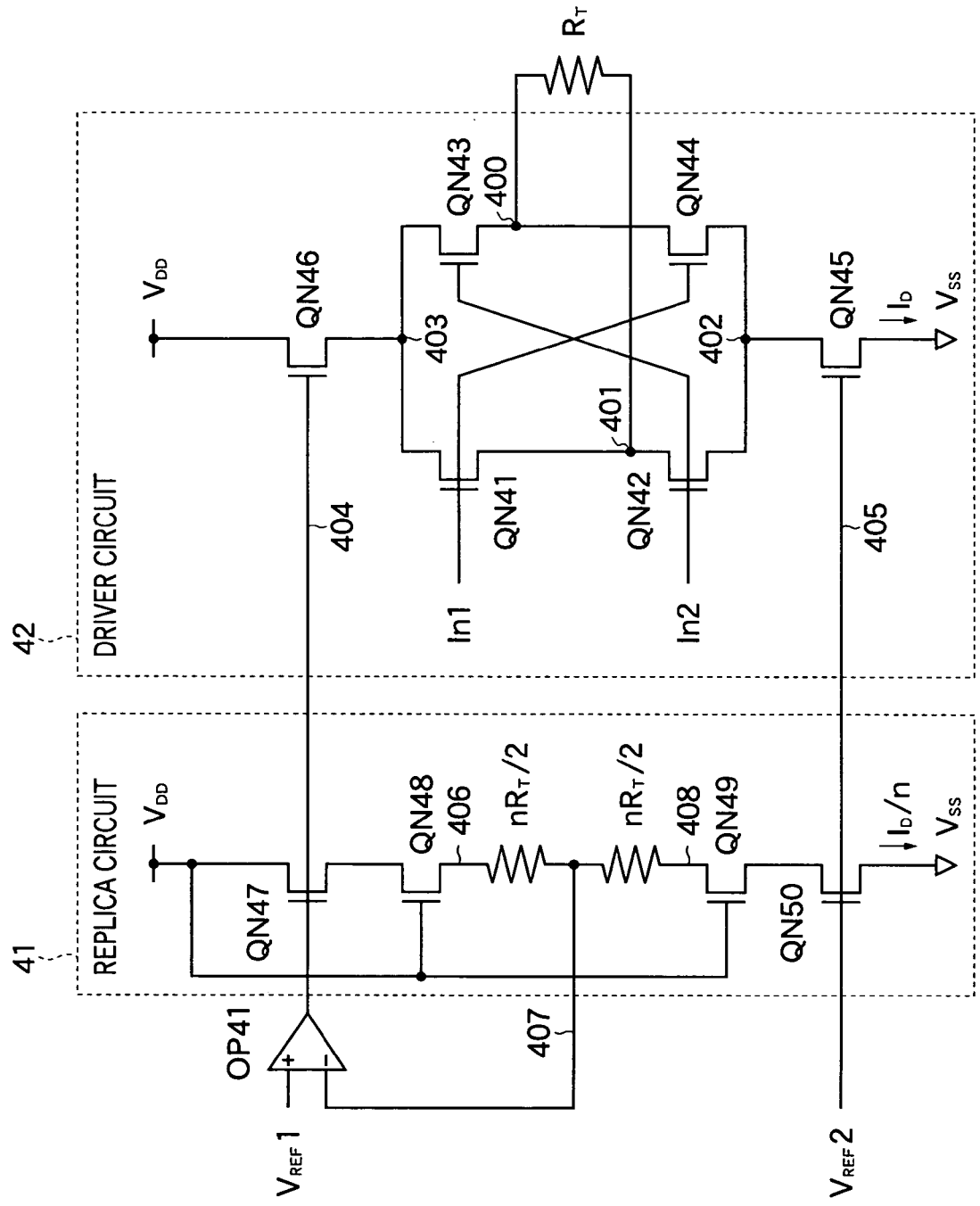
FIG. 4 is a circuit diagram showing the constitution of a line driver included in a semiconductor integrated circuit according to one embodiment of the present invention.

In FIG. 4, the constitution of a line driver included in a semiconductor integrated circuit according to one embodiment of the present invention is shown. As shown in FIG. 4, the line driver is constituted by a driver circuit 42 and a replica circuit 41 for controlling the operation of the driver circuit 42.

The driver circuit 42 includes an output circuit constituted by N-channel MOS transistors QN41 to QN44 for performing switching operation as differential signals In1 and In2 are input to the gates thereof, an N-channel MOS transistor QN46 connected between a power supply potential $V_{DD}$ on the higher voltage side and a drain (node 403) of the transistors QN41 and QN43, and an N-channel MOS transistor QN45 connected between a source (node 402) of the transistors QN42 and QN44 and a power supply potential $V_{SS}$ on the lower voltage side. In the transistor QN45, drain current $I_D$ flows according to a reference potential $V_{REF}2$, and thereby, the operating current of the output circuit is determined.

In order to supply a suitable potential to a gate (node 404) of the transistor QN46 serving as a source follower, the replica circuit 41 is connected. The replica circuit 41 includes N-channel MOS transistors QN47 to QN5O having 1/n sizes of that of the transistors QN41 to QN46 used in the driver circuit 42, respectively, and two resistances each having resistance values of n/2 times that of the terminating resistance $R_T$ on the reception side. In the transistor QN5O, a drain current of 1/n of the drain current $I_D$ of the transistor QN45 flows. Here, n is a positive real number (the number larger than zero).

In the replica circuit 41, the transistors QN48 and QN49 respectively connected to both sides (nodes 406 and 408) of the two resistances correspond to the transistors QN41 to QN44 of the output circuit. However, while the transistors QN41 to QN44 perform switching operation, the transistors QN48 and QN49 constantly assume the on-state. The transistor QN47 is a voltage source and connected between the power supply potential $V_{DD}$ on the higher voltage side and a drain of the transistor QN48. The gate voltage of the transistor QN47 is controlled by an operational amplifier OP41 as a kind of differential amplifier. The transistor QN50 is connected between a source of the transistor QN49 and the power supply potential $V_{SS}$ on the lower voltage side.

To a non-inverting input of the operational amplifier OP41, a reference potential $V_{REF}1$ is supplied, and, to an inverting input of the operational amplifier OP41, a potential of a node 407 is fed back. Thereby, the potential of the node 407 is controlled so as to approach the reference potential $V_{REF}1$. In the MOS transistor QN50, drain current flows according to the reference potential $V_{REF}2$, and thereby, the operating current of the replica circuit 41 is determined.

The potentials of the respective input signals In1 and In2 vary in a range from the power supply potential $V_{SS}$ on the lower voltage side to the power supply potential $V_{DD}$ on the higher voltage side. In accordance with this, the transistors QN41 to QN44 of the output circuit perform switching operation.

For example, when the input signal In1 is at the low level and the input signal In2 is at the high level, the transistors QN41 and QN44 assume the off-state and the transistors QN42 and QN43 assume the on-state. Thereby, the current $I_D$ flows in the terminating resistance $R_T$ on the reception side and an output voltage $\Delta V = I_D \times R_T$ is generated between a node 400 and a node 401. Simultaneously, in the replica circuit 41, current $I_D/n$ also flows in the two resistances and a potential difference $\Delta V_R = (I_D/n) \times (nR_T/2 + nR_T/2) = I_D \times R_T$ is generated between the node 406 and the node 408.

On the other hand, when the input signal In1 is at the high level and the input signal In2 is at the low level, the transistors QN41 and QN44 assume the on-state and the transistors QN42 and QN43 assume the off-state. Thereby, the reverse current $I_D$ flows in the terminating resistance $R_T$ on the reception side and the output voltage $\Delta V = I_D \times R_T$ is generated between the node 401 and the node 400. Simultaneously, in the replica circuit 41, current $I_D/n$ also flows in the two resistances and the potential difference $\Delta V_R = (I_D/n) \times (nR_T/2 + nR_T/2) = I_D \times R_T$ is generated between the node 406 and the node 408.

Further, in the drive circuit 42, assuming that the potentials of the node 400 and the node 401 are $V_{400}$ and $V_{401}$, respectively, an offset potential $V_{OS}$ of the differential output is expressed by $V_{OS} = (V_{400} + V_{401})/2$. The value thereof varies in conjunction with the potential $V_{OSR} = (V_{406} + V_{408})/2 = V_{407}$ of the connection point (node 407) between the two resistances in the replica circuit 41. Therefore, the reference potential $V_{REF}1$ supplied to the non-inverting input of the operational amplifier OP41 is determined so that the offset potential $V_{OS}$, i.e. the potential of the node 407 may take a target value.

As described above, in the embodiment, since the current of the output circuit is controlled by the transistor QN45 and the transistor QN50 and the amplitude of the output circuit is controlled based on the potential at the connection point between the two resistances provided as replicas of terminating resistances, the voltage and the offset potential of the output signal can be stabilized without increasing the number of operational amplifiers. Especially, since no operational amplifier exists in the driver circuit, the circuit configuration becomes simple and there is no possibility of oscillation. Further, by varying one reference potential, the voltage of the output signal can be changed with the offset potential kept constant.

INDUSTRIAL APPLICABILITY

The present invention can be utilized in signal transmission between a graphic board of a personal computer and a display unit and the like.

The invention claimed is:

1. A semiconductor integrated circuit comprising:
    an output circuit including plural transistors supplied with differential signals, for performing switching operations;
    a first transistor connected between a first power supply potential and said output circuit;
    a second transistor connected between said output circuit and a second power supply potential;
    a third transistor connected to the first power supply potential;
    a fourth transistor for flowing therein a current proportional to a current flowing in said second transistor;
    a first resistance and a second resistance disposed in a path of a current flowing between said third transistor and said fourth transistor; and
    a differential amplifier for controlling gate potentials of said first and third transistors such that a potential at a connection point between said first resistance and said second resistance approaches a predetermined potential.

2. The semiconductor integrated circuit according to claim 1, wherein said first power supply potential is higher than said second power supply potential, and each of said first to fourth transistors includes an N-channel MOS transistor.

3. The semiconductor integrated circuit according to claim 1, wherein said output circuit includes:
    a fifth transistor and a sixth transistor serially connected between said first transistor and said second transistor, said fifth transistor having a gate to which a first signal included in the differential signals is supplied and said sixth transistor having a gate to which a second signal included in the differential signals is supplied; and a seventh transistor and a eighth transistor serially connected between said first transistor and said second transistor, said seventh transistor having a gate to which the second signal included in the differential signals is supplied and the eighth transistor having a gate to which the first signal included in the differential signals is supplied.

4. The semiconductor integrated circuit according to claim 3, wherein said first power supply potential is higher than said second power supply potential, and each of said fifth to eighth transistors includes an N-channel MOS transistor.

5. The semiconductor integrated circuit according to claim 3, wherein a terminating resistance is connected between a connection point between said fifth transistor and said sixth transistor and a connection point between said seventh transistor and said eighth transistor via a signal line.

6. The semiconductor integrated circuit according to claim 1, further comprising:
   a ninth transistor connected between said third transistor and said first resistance; and
   a tenth transistor connected between said second resistance and said fourth transistor.

7. The semiconductor integrated circuit according to claim 6, wherein, assuming that n is a number larger than zero, a current flowing in said third, fourth, ninth, and tenth transistors is 1/n of that flowing in said first and second transistors.

8. The semiconductor integrated circuit according to claim 7, wherein each of said third, fourth, ninth, and tenth transistors has a size of 1/n of that of each of said first and second transistors.

9. The semiconductor integrated circuit according to claim 7, wherein each of said first and second resistances has a resistance value of n/2 times that of the terminating resistance connected to said output circuit.

10. The semiconductor integrated circuit according to claim 1, wherein said differential amplifier comprises:
    a non-inverting input terminal to which a reference potential is supplied;
    an inverting input terminal to which a potential at a connection point between said first resistance and said second resistance is supplied; and
    an output terminal for supplying an output potential to gates of said first and third transistors.

* * * * *